(12) United States Patent
Hodel et al.

(10) Patent No.: US 12,515,305 B2
(45) Date of Patent: Jan. 6, 2026

(54) ELECTRODE TIP IMPACT TOOLS AND METHODS OF INSTALLING ELECTRODES

(71) Applicant: Toyota Motor Engineering & Manufacturing North America, Inc., Plano, TX (US)

(72) Inventors: Bryan E. Hodel, Frankfort, KY (US); John E. Doyle, Paris, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 319 days.

(21) Appl. No.: 17/580,083

(22) Filed: Jan. 20, 2022

(65) Prior Publication Data

US 2023/0226677 A1    Jul. 20, 2023

(51) Int. Cl.
*B25D 1/00* (2006.01)
*B23K 11/30* (2006.01)

(52) U.S. Cl.
CPC ............ *B25D 1/00* (2013.01); *B23K 11/3072* (2013.01)

(58) Field of Classification Search
CPC ... B23K 11/3072; B23K 11/314; B23K 11/36; B25D 1/00; B25D 3/00; B25B 27/00; B25B 27/02
See application file for complete search history.

(56) References Cited

U.S. PATENT DOCUMENTS

| | | | | |
|---|---|---|---|---|
| 2,910,771 A | * | 11/1959 | Farmer | B25D 3/00 30/167 |
| 5,315,725 A | * | 5/1994 | Vanden Heuvel | B25D 1/00 7/147 |
| 5,937,466 A | * | 8/1999 | Brainerd | B26B 23/00 7/162 |
| 6,437,280 B1 | | 8/2002 | Sharma | |
| 10,894,298 B2 | | 1/2021 | Nakajima | |
| 2017/0014883 A1 | * | 1/2017 | Streen | B25D 5/00 |

FOREIGN PATENT DOCUMENTS

| | | | | |
|---|---|---|---|---|
| CA | 2242178 A1 | * | 8/1999 | ............ B25D 3/00 |
| JP | 4181731 B2 | | 11/2008 | |
| KR | 19980017872 U | * | 7/1998 | |
| KR | 20130008682 A | * | 1/2013 | |
| KR | 2020160001488 U | | 5/2016 | |
| WO | 2017141283 A1 | | 8/2017 | |

OTHER PUBLICATIONS

Translation of KR-20130008682-A (Year: 2013).*
Translation of KR-19980017872-U (Year: 1998).*

* cited by examiner

*Primary Examiner* — Matthew P Travers
(74) *Attorney, Agent, or Firm* — Dinsmore & Shohl LLP

(57) ABSTRACT

An electrode tip impact tool for mounting an electrode tip to a welding robot includes a handle and a head at an end of the handle. The head includes a first edge comprising a tip-receiving bore sized to receive an electrode tip and an opposite second edge comprising a raised ridge for striking the head with a hammer.

14 Claims, 5 Drawing Sheets

ELECTRODE TIP IMPACT TOOLS AND METHODS OF INSTALLING ELECTRODES

TECHNICAL FIELD

The present specification generally relates to electrode assembly tools, and more specifically, electrode tip impact tools that are used to assemble electrode tips to welding robots.

BACKGROUND

A number of automated machines (industrial robots) are available for various assembly functions within automobile assembly lines. As an example, automated machines may be used for picking target objects, for example, from a bin or other location and placing the objects at a different, preselected location. As another example, automated machines may be used for welding, such as resistance spot welding. In resistance spot welding, an electrode tip is used to convey an electrical current through a pair of weld pieces. Pressure and heat are used to fuse the weld pieces together.

Over a number of uses, the electrode tips may need to be replaced. Accordingly, a need exists for electrode assembly tools and, in particular, an electrode tip impact tool that facilitates electrode handling and assembly.

SUMMARY

In one embodiment, an electrode tip impact tool for mounting an electrode tip to a welding robot includes a handle and a head at an end of the handle. The head includes a first edge comprising a tip-receiving bore sized to receive an electrode tip and an opposite second edge comprising a raised ridge for striking the head with a hammer.

In another embodiment, a method of assembling an electrode tip onto a weld arm of a welding robot using an electrode tip impact tool is provided. The method includes placing an electrode tip at an electrode mounting location of the weld arm. The impact tool is aligned with the electrode tip such that the electrode tip is inserted into a tip-receiving bore. The impact tool includes a handle and a head at an end of the handle. The head includes a first edge comprising the tip-receiving bore sized to receive the electrode tip and an opposite second edge comprising a raised ridge for striking the head with a hammer. The raised ridge is struck with a hammer with the electrode tip in the tip-receiving bore.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to an electrode tip impact tools for assembling electrode tips to a welding robots. The impact tools include a handle and a head at an end of the handle. The head includes a first edge comprising a bore sized to receive an electrode tip and an opposite second edge comprising a raised ridge for striking the head with a hammer. Striking the head with a hammer forces the electrode tip carried within the bore. The head can be an one-piece, monolithic structure with an opening through its center, which can reduce the overall weight of the impact tool.

Figure 1:
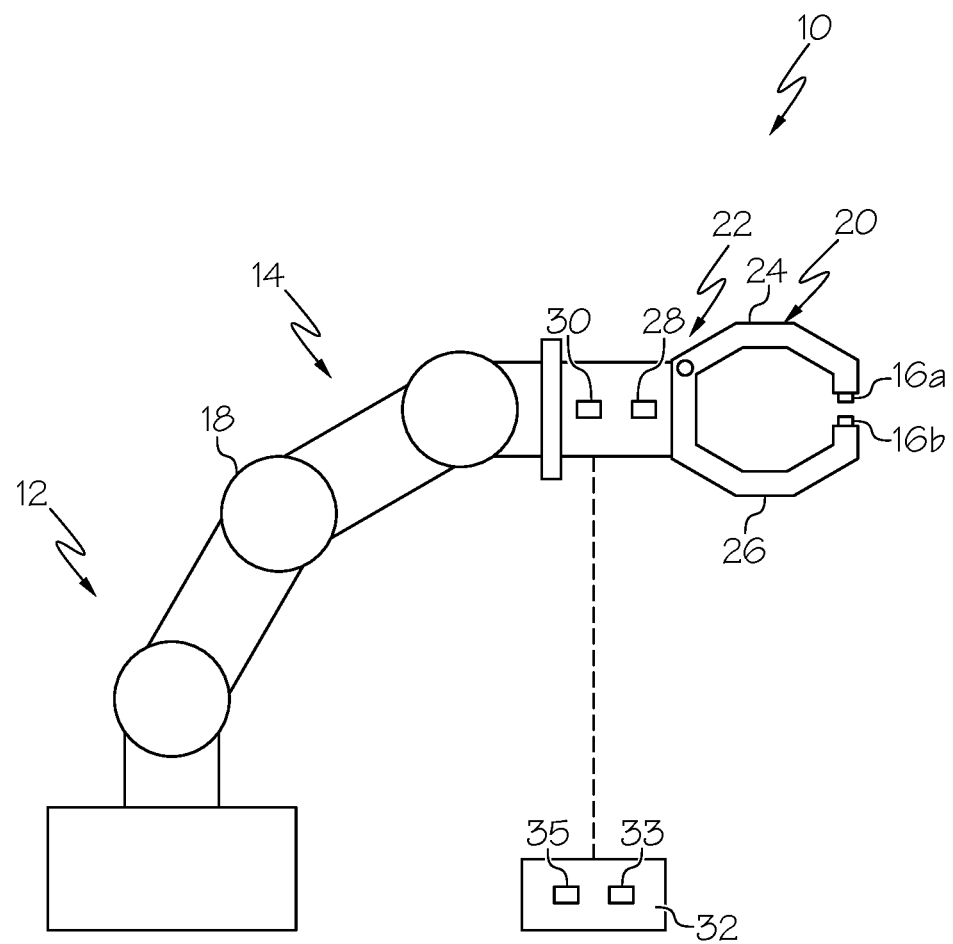
FIG. 1 illustrates a diagrammatic view of a welding robot with electrode tip, according to one or more embodiments shown and described herein.

Referring to FIG. 1, an automated machine 10 includes a robotic arm 14 with a replaceable component 16. In the illustrated example, the automated machine 12 is a welding robot that is configured for resistance spot welding and the replaceable component 16 is an electrode tip. As used herein, the term "robot" refers to a machine that is programmable to perform a series of actions automatically. It should be noted that while one robotic arm 14 is illustrated, the system may include multiple robotic arms, such as two or more, four or more, eight or more 15 or more, 20 or more, etc. The robotic arm 14 may include a number of joints 18 that allow the robotic arm 14 to pivot, rotate and/or translate. At each joint 18, there may be a servo motor that moves the robotic arm 14 at the respective joint 18 and an encoder (i.e., a sensor) that can be used to detect an angle of the robotic arm 14.

The robotic arm 14 further includes a tool 20 that is located at an end 22 of the robotic arm 14. The tool 20 may be, for example, a resistance welding tool that includes a movable weld arm 24 and a stationary weld arm 26. Both the movable weld arm 24 and the stationary weld arm 26 include the replaceable component 16. The movable weld arm 24 can be pivoted or otherwise moved toward and away from the stationary weld arm 26 using a motor 28 and sensor 30 for a resistance welding operation.

A control system 32 may be part of or communicatively coupled to the robotic arm 14 for controlling movement of the motors and receive signals from the sensors. The control system 32 can acquire the signals from the sensors and control the various motors thereby moving the robotic arm 14 including the tool 20. The control system 32 may include one or more computers, processors 33, etc. that can be programmed using logic saved in memory 35.

Figure 2:
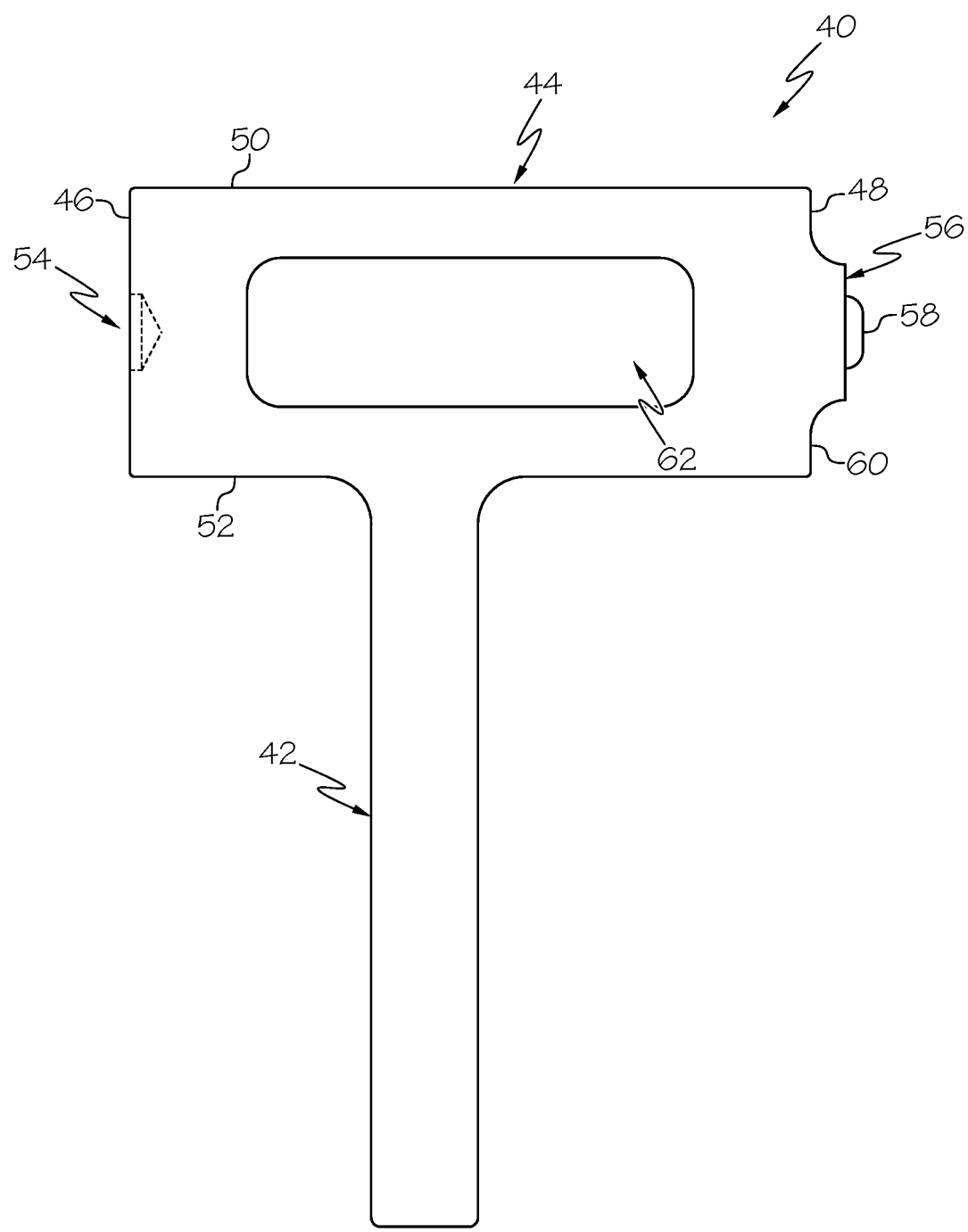
FIG. 2 is a side view of an electrode tip impact tool for use in installing an electrode tip on the welding robot of FIG. 1, according to one or more embodiments shown and described herein.
Figure 3:
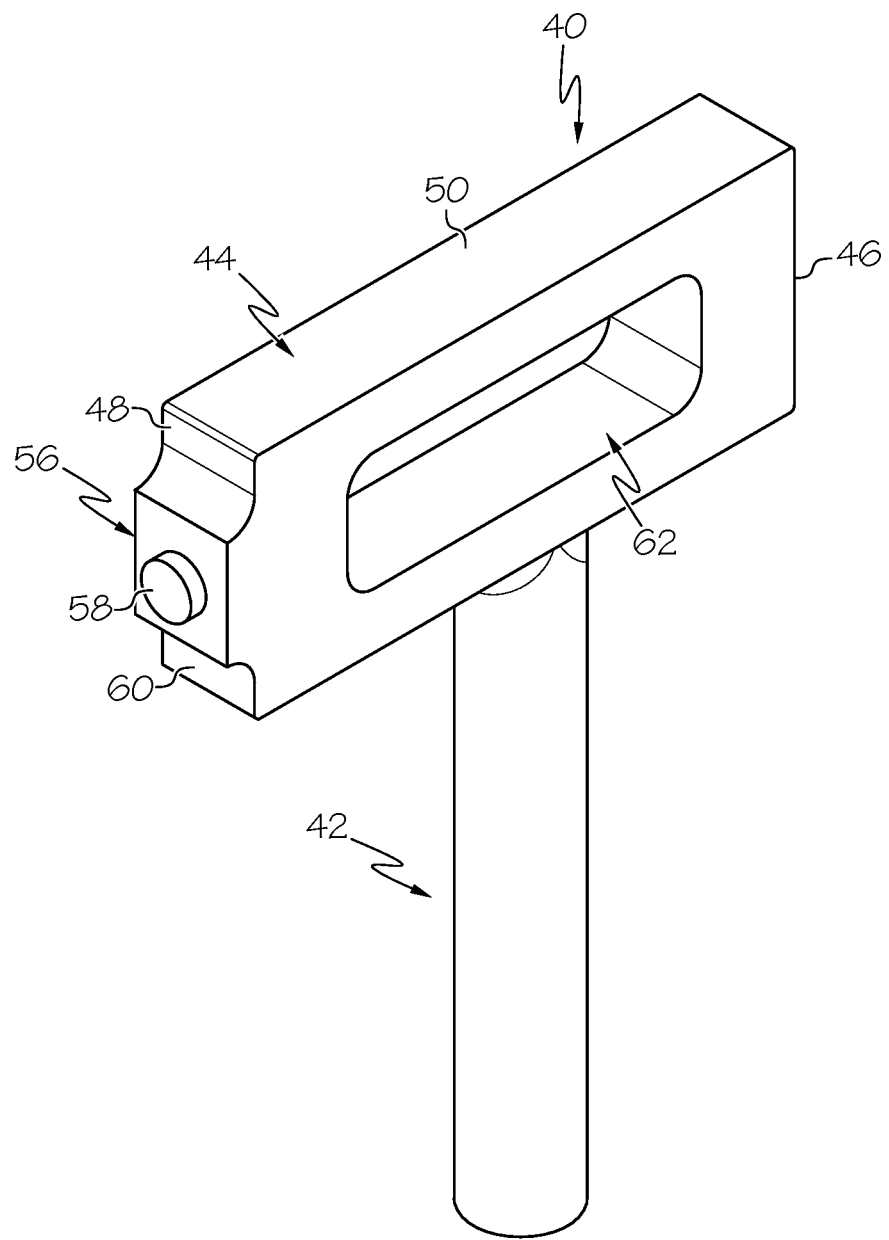
FIG. 3 is a perspective view of the electrode tip impact tool of FIG. 2, according to one or more embodiments shown and described herein.
Figure 4:
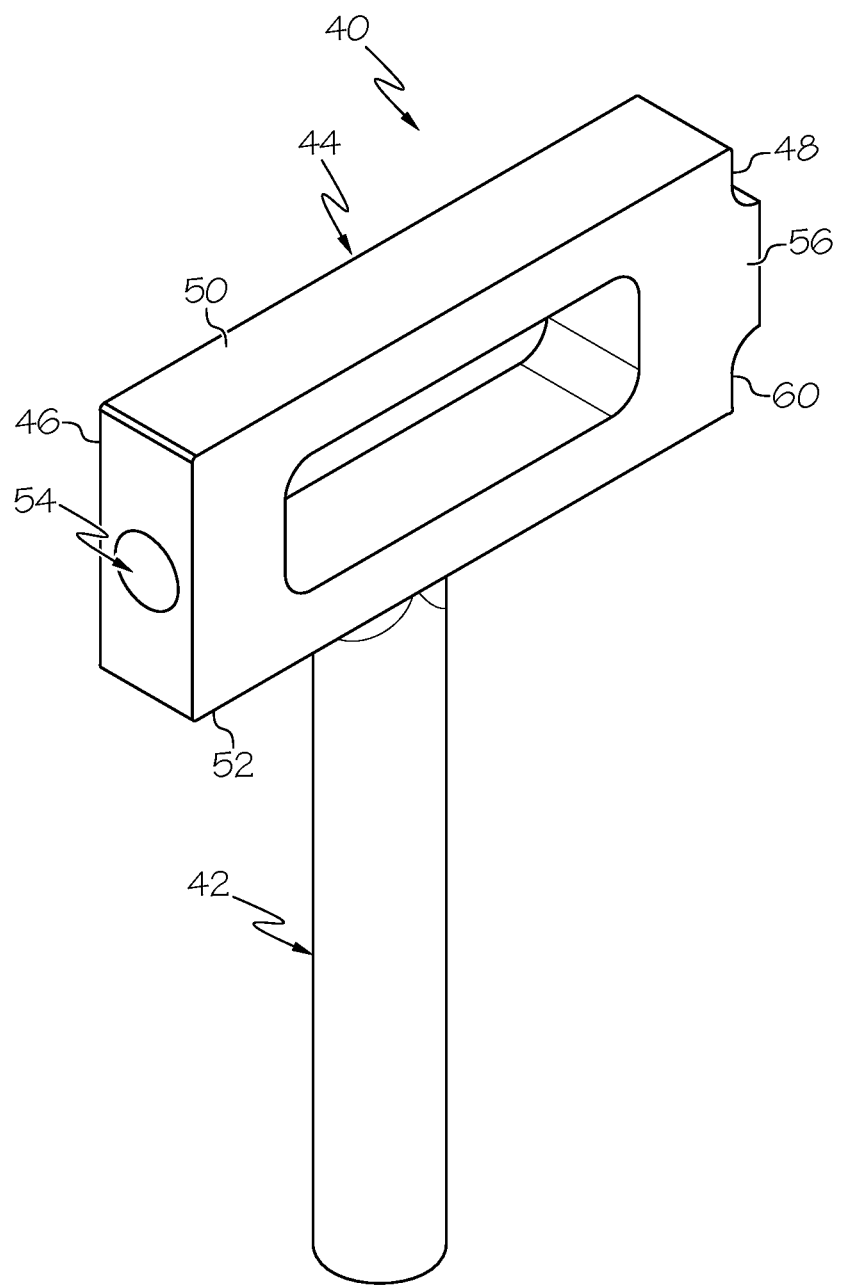
FIG. 4 is another perspective view of the electrode tip impact tool of FIG. 2, according to one or more embodiments shown and described herein.

Referring to FIGS. 2-4, an electrode tip impact tool 40 may be used to assemble the electrode tips 16 weld arms 24 and 26 as shown by FIG. 1. The impact tool 40 includes a handle 42 and a head 44 at an end of the handle resembling a hammer. In some embodiments, the head 44 and the handle 42 may be formed of a single, monolithic piece of material, such as stainless steel. The head 44 includes a first edge 46, an opposite second edge 48, a top 50 and a bottom 52 that extend between the first and second edges 46 and 48. In some embodiments, the first and second edges 46 and 48 and top and bottom 50 and 52 may be substantially parallel thereby forming a generally rectangular shape. The first edge 46 includes a tip-receiving bore 54 formed therein that sized to receive the electrode tip 16. The second edge 48 includes a raised ridge 56 with a striking projection 58 that protrudes outward from a flat surface 60 of the raised ridge 56 for striking the head with a hammer. The head 44 also includes an opening 62 formed therethrough that can reduce the material and weight of the head 44, which can improve the maneuverability of the overall impact tool 40. The opening 62 may cover, for example, at least 20 percent, such as at least 30 percent, such as at least 40 percent, such as at least 50 percent of an overall surface area of a rectangular portion 64 (L×W) of the head 44 with the head 44 completely surrounding the opening 62. Any suitable method can be used for forming the impact tool 40 such as casting and/or machining.

Figure 5:
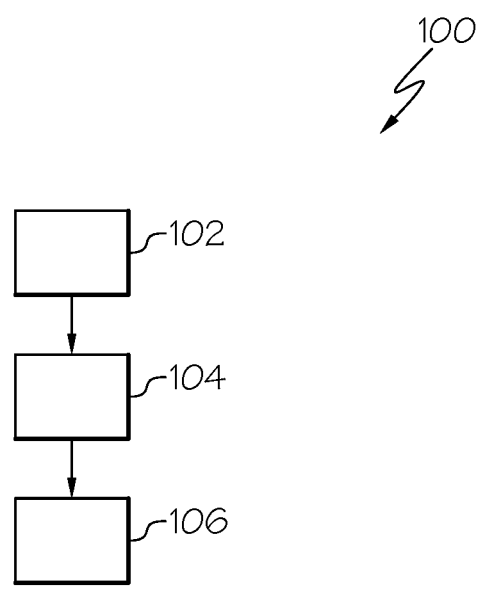
FIG. 5 illustrates a method of assembling an electrode tip onto a weld arm of a welding robot using the electrode tip impact tool of FIGS. 2-4, according to one or more embodiments shown and described herein.

Referring to FIG. 5, a method 100 of assembling an electrode tip onto a weld arm of a welding robot is illustrated. The method includes placing an electrode tip at an electrode mounting location of the weld arm at step 102. The electrode tip may initially be placed at the electrode mounting location by hand. At step 104, the impact tool is aligned with the electrode tip such that the electrode tip is inserted into the tip-receiving bore. At step 106, once the electrode tip is seated within the tip-receiving bore, the striking projection is struck with a hammer to firmly mount the electrode tip to the mounting location. The process can be repeated again for another electrode tip. Then, a welding operation can be performed using the electrode tips.

The above-described electrode tip impact tools can allow for electrode tip changing a welding robots with a relatively small tip clearance compared to other welding robots without misaligning tips. Misaligned electrode tips can result in a reduction in weld quality. The electrode tip impact tools can allow the impact tool to be properly aligned before striking the electrode tip, which can improve alignment on a more consistent basis. The electrode tip impact tools can be formed of a low electrically conductive material, such as a stainless steel. The raised ridge and striking projection can be provided to help focus the force provided by a hammer.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue and the tip-receiving bore can provide for accurate alignment with the electrode tip.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electrode tip impact tool for mounting an electrode tip to a welding robot, the impact tool comprising:
    a handle;
    a head at an end of the handle, the head includes a first edge comprising a tip-receiving bore sized to receive an electrode tip and an opposite second edge comprising a raised ridge for striking the head with a hammer; and
    a striking projection that extends outward from a flat surface of the raised ridge completely surrounding the striking projection;
    wherein the handle extends outward from a bottom of the head, the bottom extending between the first and second edges and having a first length in a direction perpendicular to the handle that is greater than a height in a direction parallel to the handle of the first and second edges, the head having a top that is opposite of and parallel to the bottom extending between the first and second edges, the tip-receiving bore extending inward from the first edge toward the raised ridge;
    wherein the raised ridge and striking projection together extend outward from the second edge a second length in the direction perpendicular to the handle that is less than the first length of the bottom of the head.

2. The impact tool of claim 1, wherein the first edge and the second edge are parallel and parallel to the handle.

3. The impact tool of claim 2, wherein the top and bottom are parallel and perpendicular to the handle such that the head is rectangular in shape.

4. The impact tool of claim 3, wherein a rectangular portion of the head has an opening that extends therethrough.

5. The impact tool of claim 4, wherein the opening extends over at least 20 percent of the rectangular portion.

6. The impact tool of claim 1, wherein the head and handle are formed from a single, monolithic piece of material.

7. The impact tool of claim 6, wherein the material is stainless steel.

8. A method of assembling an electrode tip onto a weld arm of a welding robot using an electrode tip impact tool, the method comprising:
    placing an electrode tip at an electrode mounting location of the weld arm;
    aligning the impact tool with the electrode tip such that the electrode tip is inserted into a tip-receiving bore, the impact tool comprising:
        a handle;
        a head at an end of the handle, the head includes a first edge comprising the tip-receiving bore sized to receive the electrode tip and an opposite second edge comprising a raised ridge for striking the head with a hammer; and
        a striking projection that extends outward from a flat surface of the raised ridge completely surrounding the striking projection;
        wherein the handle extends outward from a bottom of the head, the bottom extending between the first and second edges and having a first length in a direction perpendicular to the handle that is greater than a height in a direction parallel to the handle of the first and second edges, the head having a top that is opposite of and parallel to the bottom extending between the first and second edges, the tip-receiving bore extending inward from the first edge toward the raised ridge;
        wherein the raised ridge and striking projection together extend outward from the second edge a second length in the direction perpendicular to the handle that is less than the first length of the bottom of the head; and
    striking the raised ridge with a hammer with the electrode tip in the tip-receiving bore.

9. The method of claim 8, wherein the first edge and the second edge of the head are parallel and parallel to the handle.

10. The method of claim 9, wherein the top and bottom are parallel and perpendicular to the handle such that the head is rectangular in shape.

11. The method of claim 10, wherein a rectangular portion of the head has an opening that extends therethrough.

12. The method of claim 11, wherein the opening extends over at least 20 percent of the rectangular portion.

13. The method of claim 8, wherein the head and handle are formed from a single, monolithic piece of material.

14. The method of claim 13, wherein the material is stainless steel.

\* \* \* \* \*